(12) United States Patent
Kelley (10) Patent No.: US 6,405,171 B1
(45) Date of Patent: Jun. 11, 2002

(54) DYNAMICALLY LOADABLE PHRASE BOOK LIBRARIES FOR SPOKEN LANGUAGE GRAMMARS IN AN INTERACTIVE SYSTEM

(75) Inventor: Colin Kelley, Oak View, CA (US)

(73) Assignee: Unisys PulsePoint Communications, Carpinteria, CA (US)

( * ) Notice: Subject to any disclaimer, the term of this patent is extended or adjusted under 35 U.S.C. 154(b) by 0 days.

(21) Appl. No.: 09/243,211

(22) Filed: Feb. 2, 1999

Related U.S. Application Data
(60) Provisional application No. 60/073,424, filed on Feb. 2, 1998.

(51) Int. Cl.[7] .................................................. H04M 1/64
(52) U.S. Cl. ......................... 704/270; 704/257; 379/71
(58) Field of Search ................................ 704/257, 260, 704/235, 231, 251, 270, 277; 379/68, 71

(56) References Cited

U.S. PATENT DOCUMENTS

| 4,365,315 | A | | 12/1982 | Jamnik ........................ 364/900 |
|---|---|---|---|---|
| 5,384,701 | A | * | 1/1995 | Stentiford et al. ............ 704/3 |
| 5,561,800 | A | * | 10/1996 | Sabatella ...................... 709/305 |
| 5,745,881 | A | * | 4/1998 | Tada et al. .................... 705/10 |
| 5,765,131 | A | * | 6/1998 | Stentiford et al. .......... 704/277 |
| 5,884,247 | A | * | 3/1999 | Christy ........................ 704/7 |
| 5,983,182 | A | * | 11/1999 | Moore ......................... 704/270 |
| 6,044,337 | A | * | 3/2000 | Gorin et al. .................. 704/1 |
| 6,058,166 | A | | 5/2000 | Osder et al. .............. 379/88.22 |
| 6,061,646 | A | * | 5/2000 | Martino et al. ............... 704/3 |
| 6,173,266 | B1 | * | 1/2001 | Marx et al. ................. 704/270 |

FOREIGN PATENT DOCUMENTS

| EP | 0 121 071 | 10/1984 |
|---|---|---|
| WO | WO 94/11811 | 5/1994 |

* cited by examiner

*Primary Examiner*—William Korzuch
*Assistant Examiner*—Abul K. Azad
(74) *Attorney, Agent, or Firm*—Woodcock Washburn; Mark T. Starr; Lise A. Rode (57) ABSTRACT

A system comprises a voice application with which a user interacts, and at least one dynamically-loadable phrase book library, separate from the voice application, that comprises, for each of a plurality of different phrases of a particular language, a method comprising code that when executed causes the phrase to be played. The voice application invokes execution of a selected method of the dynamically-loadable phrase book library to cause a corresponding phrase to be played to the user. In this manner, the code that causes different phrases to be played is separated from the voice application. A method for designing such a system is also disclosed.

18 Claims, 10 Drawing Sheets

DYNAMICALLY LOADABLE PHRASE BOOK LIBRARIES FOR SPOKEN LANGUAGE GRAMMARS IN AN INTERACTIVE SYSTEM

CROSS-REFERENCE TO RELATED APPLICATIONS

This application claims priority of U.S. provisional Application No. 60/073,424 filed Feb. 2, 1998, the disclosure of which is incorporated fully herein by reference.

FIELD OF THE INVENTION

This invention relates generally to the field of voice communication applications. More particularly, this invention relates to dynamically loadable phrase book libraries that allow voice applications to "speak" in different languages.

BACKGROUND OF THE INVENTION

Voice communication applications often include voice mail systems, automated menu systems, or voice information retrieval systems. A voice mail system may "speak" to callers by replaying a stored greeting message when a telephone call is first answered by the voice mail system. For example, a greeting message in English may take the form of "Welcome to your voice mail messaging system." The voice mail system may then present the caller with an option menu that may allow callers to retrieve messages or record new greetings.

Automated menu systems is another example of voice applications. These are often employed by companies to help callers reach the right department or person to meet their needs or resolve their problems quickly and efficiently. For example, these systems may greet callers with the message "To speed your call, press '1' for Sales, press '2' for Customer Service, or wait and an operator will assist you." Use of automated menu systems allows companies to handle increased calling volumes without having to hire additional operators.

And yet another example of voice applications is voice information retrieval systems. These allow callers to use their telephones to retrieve specific information without human assistance. Banks often use these systems to allow customers to access their banking account information 24-hours a day. The system may prompt users for input and provide them with options to guide users in retrieving the desired information. These options may allow retrieval of account balance, amounts and dates of withdrawals, or amounts and dates of deposits.

Considering these various voice communication applications then, it becomes clear that many times the "speaking" capabilities of these applications must extend beyond simple greetings to encompass more complex phrases. A voice mail system, for instance, must inform the caller as to the number of new messages by speaking the phrase "You have <n> new [message/messages]," where <n> is the number of new messages at that instant time, and the word "message" is used when <n>=1, but the word "messages" is used when <n> does not equal to 1.

It is usually not feasible to store a recording of this phrase for every possible value of <n>. Instead, voice recordings in a particular language, such as English, would typically be made for the phrases "You have," "new message," and "new messages," as well as for the words "no," "one," "two," "three," etc. These recordings are called "utterances." A programmer with knowledge of the English grammar would then write software to select the correct utterances that are replayed, as well as the order in which they are replayed, based on the value of <n>.

If the voice application must speak in a language other than English, the recorded utterances are typically replaced one-for-one with the new language. This may work for similar languages, like two Romance languages that share the same syntax and grammar. However, this one-for-one translation will not work for languages that have different grammars. These may require that different utterances be recorded or that the order in which the utterances are replayed be changed. For instance, in the prior voice mail application example, the application will select the word "messages" if <n>=0, to speak the phrase "You have no new messages." However, if this sentence were to be translated in Spanish, a word-for-word substitution would not result in an accurate translation because, among other things, the Spanish equivalent of the word "message," and not "messages," must be utilized when <n>=0, to create the sentence "Usted no tiene ningun mensaje."

The application software, therefore, must be changed in order to support new languages. Such modifications take time and incur additional expenses, which thereby limit the multinational capability of existing voice applications in an increasingly international marketplace. For example, for applications like voice mail systems which aspire uptime percentages of greater than 99.9%, it is undesirable to have to "waste" any downtime for loading new or updated software to add or modify the language of the system.

Therefore, it would be highly desirable to have a system which would allow voice applications to add or modify languages used by the application without stopping.

DETAILED DESCRIPTION OF THE INVENTION

The system under a preferred embodiment of the present invention separates the software containing the logic to "speak" different phrases, from the rest of the voice application software, into a dynamically-loadable library ("DLL"). In this way, the application may support a new language without requiring the reprogramming or modification of its core software.

In a preferred embodiment, the system aids a programmer to create "phrase books" using the C++ object-oriented (OO)

programming language. These phrase books contain phrases spoken by the voice application. The C++ language is well-known by one skilled in the art and many articles and texts are available which describe the language. Accordingly, the details of the C++ language will not be discussed.

Turning now to OO programming, OO modeling and design allow one to think about problems abstractly using real-world concepts rather than computer concepts. Thus, in OO modeling, real-world concepts are represented as "objects" that combine both data structure and behavior in a single entity.

An object model describes the structure of objects in a system, namely their identity, their relationships to other objects, their properties (attributes), and their behavior (operations). Objects are defined by "classes." Classes are arranged into hierarchies sharing common structure and behavior, and are associated with other classes. Classes define the attributes carried by each object and the operations that it performs or undergoes. Therefore, each object is an "instance" of its class.

The main characteristics of the OO approach are abstraction, encapsulation, polymorphism, and inheritance.

Abstraction allows one to focus on what an object is and does so without having to decide on implementation details. Proper use of abstraction allows the same model to be used for analysis, high level design, program structure, database structure, and documentation.

Encapsulation (information hiding) allows the separation of external aspects of an object, which are accessible to other objects, from the internal implementation details of the object, which are hidden from other objects. Thus, internal attributes and internal functions can be declared as "private" for use of the object itself. The external aspects of the object, on the other hand, can be declared as "public" for access by other objects. Access to private data may be controlled by defining public functions for the object which access the object's private attributes. Alternatively, internal attributes and internal functions can be declared "protected," meaning that they can be accessed by subclasses, but not by any other classes of objects.

Polymorphism in OO programming indicates that the same operation may behave differently on different classes. For instance, a class "File" may have an operation "print." This operation may behave differently for ASCII files, binary files, or digitized picture files. Different "methods" would have to be written for the print operation to handle the different types of files. Because an object "knows" its class, the OO programming language automatically selects the correct method to implement an operation based on the name of the operation and class of the object being operated on. In C++, methods must be explicitly declared "virtual" in order to behave polymorphically.

The fourth characteristics in OO programming is inheritance. Inheritance is the sharing of attributes and operations among classes based on a hierarchical relationship. Base classes are defined broadly and subclasses can be created from these bases classes. Each subclass incorporates, or "inherits" all the properties of the base class. A subclass may also override or modify features in the base class by simply defining the same feature within the subclass. The ability to factor out common properties of several classes into a common base class and to inherit the properties from the base class allows program developers to reuse common pieces of code.

The present system allows the support of any new language without changing the application software by separating the software which speaks the different phrases into a dynamically loadable phrase book library. Each phrase book library conforms to a phrase book interface, which has a method for each phrase, where each method may have parameters which are passed by the application software when it speaks that phrase, and which parameters are passed by the application software. This allows phrase books to be developed and tested without changing any application software. Once ready, these phrase books may be loaded dynamically into an instance of the application without stopping it.

The present system allows phrase books to be modeled as objects. Representing phrase books as objects encapsulates the syntax and grammar logic of the particular language. This allows the language grammar to be independent of the application flow.

A preferred embodiment of the present invention therefore consists of a computer system having a graphical user interface ("GUI"), CPU, memory, compiler, OO database, and multi-media software and hardware. The computer system used in the preferred embodiment is an IBM compatible personal computer (IBM is a registered trademark of International Business Machines Corporation) running on a Pentium microprocessor with 24 Mbytes of RAM (random access memory.) The operating system utilized by the computer is Windows NT 4.0 (Windows NT is a registered trademark of Microsoft Corporation) or higher.

Before proceeding with a detailed description of the present invention, definitions of certain terms are provided below.

An "utterance" is a voice sample file, that is, a digital recording of a particular person saying a particular set of words from a recording script.

A "phrase" is a collection of one or more utterances with built in logic for playing.

A "dialect" is a regional variety of human language. Some languages share the same phrase logic, but substitute one term for another. For example, in American English, the # symbol is called "pound," while in British English, the same symbol is referred to as "hash." These two dialects can share the same phrase logic, but require different wording for some of the speech samples. Another type of dialect is custom "branding" by a service provider, where for example, "mailbox" might be called "message box."

"Voice talent" is the particular person who says a particular set of words to form an utterance. Different voice talents may be used in situations where customers request that each speech sample be recorded using their own speaker. Different voice talents may also occur where a customer wants to use its own "branding" terms.

Figure 1:
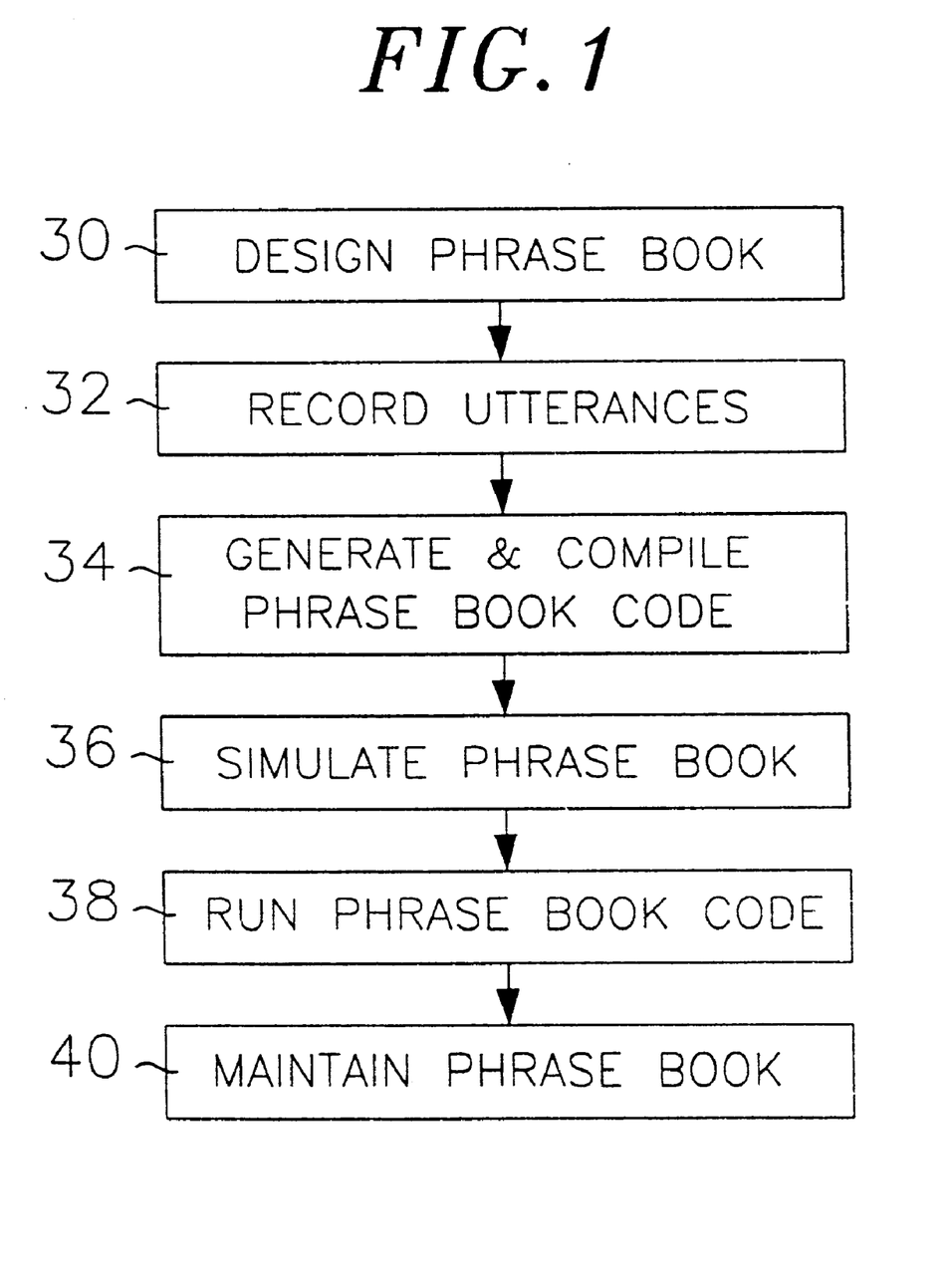
FIG. 1 is a flow diagram of an exemplary phrase book creation process.

Referring to FIG. 1, shown here is a flow diagram of an exemplary phrase book creation process. The process starts with the design of a phrase book 30 using OO techniques. Utterances used in the phrase book are then recorded 32. Next, code is generated and compiled for the designed phrase book 34, resulting in a phrase book DLL. The designer may then simulate the phrase book 36. Once the phrase book creation is complete, the voice application uses the phrase book by running its code 38.

The phrase book is thereafter maintained 40 and modified as necessary.

Figure 2:
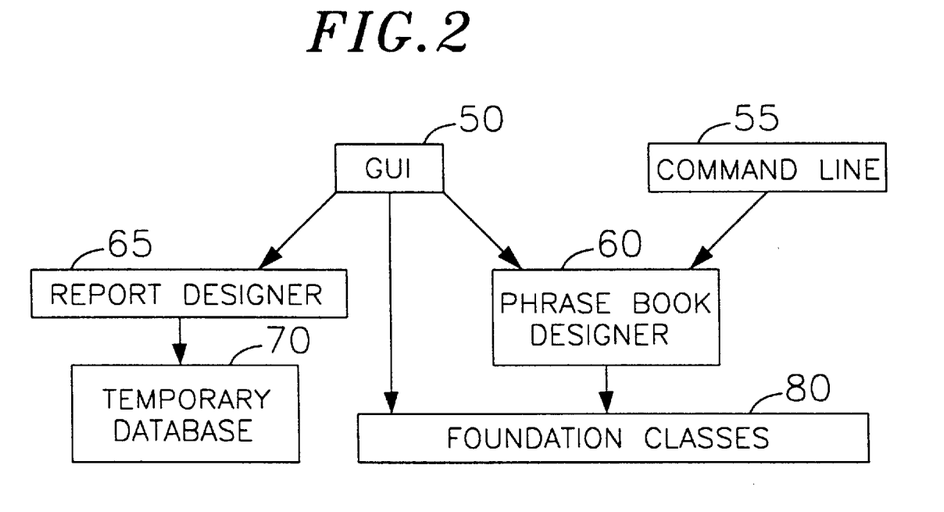
FIG. 2 is a block diagram of design-time tools for phrase book creation provided by a system embodying the principles of the invention.

Referring to FIG. 2, shown here is a block diagram of design-time tools provided by the system for designing phrase books. The system's GUI 50 provides a phrase book developer with a single entry point from which to design the phrase books.

The Phrase Book Designer 60 is a block representation of the tool used to design phrase books. A detailed object model showing a preferred architecture of the Phrase Book Designer 60 is described below in conjunction with a discussion of FIG. 3.

Once a phrase book has been designed, C++ code is generated by a command line interface 55. In a preferred embodiment, the command line interface 55 is run from within the Visual C++ Developer's Studio, which is available commercially from Microsoft Corporation.

The system's GUI 50 also provides a developer with a single point of entry in creating reports containing information about the phrases created.

Figure 3:
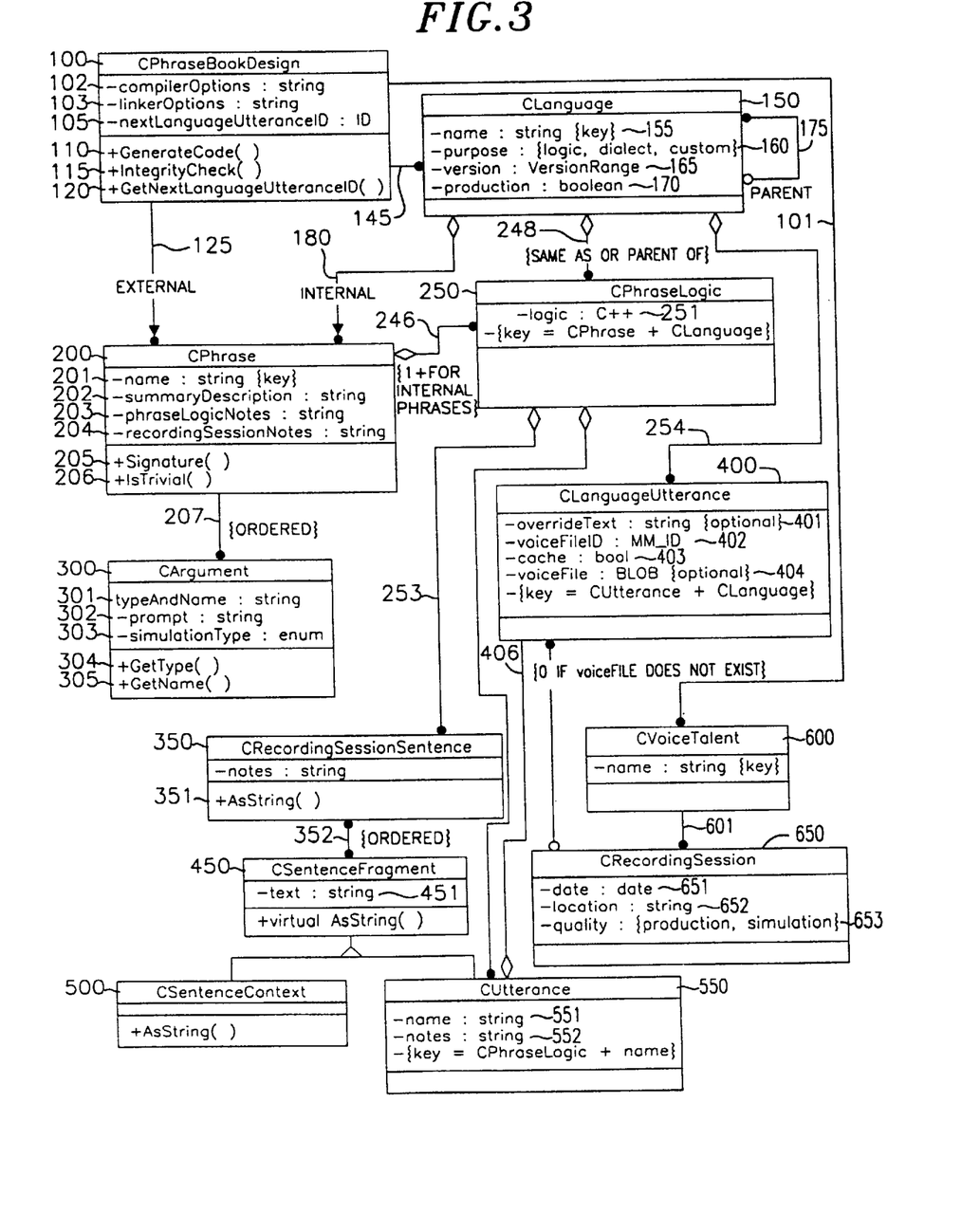
FIG. 3 is an object model diagram for the Phrase Book Designer shown in FIG. 2.

Referring to FIG. 3, shown here is an object model diagram as described in *Object Modeling and Design* by James Rumbaugh et al., Prentice Hall, 1991, illustrating the architecture for the Phrase Book Designer 60.

CPhraseBookDesign Class

The CPhraseBookDesign 100 class is the top-most class within the Phrase Book Designer 60 architecture. It provides control points for performing integrity checks on the design and generation of phrase book DLLs.

Integrity checks are made by calling an IntegrityCheck( ) 115 method. This method performs three kinds of checks. First, it verifies that the phrase logic is defined for all phrases over all languages. Second, it verifies that each utterance is a member of at least one CRecordingSessionSentence 350. Third, it verifies that each CPhraseLogic 250 has at least one CRecordingSessionSentence 350. The CRecordingSessionSentence 350 and CPhraseLogic 250 classes are explained in further detail below. The system will not generate code for a designed phrase book if it fails one of these integrity checks.

A GenerateCode( ) 110 method allows the system to generate header files and the implementation files for a designed phrase book. Phrase book code generation is described in further detail below in conjunction with FIGS. 6A–6B and 7A–7B.

The CPhraseBookDesign 100 class also hands out unique identifiers 105 for each CLanguageUtterance 400 via a GetNextLanguageUtteranceID( ) 120 method. CompilerOptions 102 and linkerOptions 103 are also assigned through the CPhraseBookDesign 100 class.

CLanguage Class

Each language is associated with a single CPhraseBookDesign 100, as depicted by association line 145. A language is represented by a CLanguage 150 class. The name 155 attribute within this class identifies the particular language.

A CLanguage 150 has one of the following purposes 160: logic, dialect, and custom. A CLanguage 150 with a purpose 160 of logic contains the logic needed to speak phrases, as shown by aggregation line 248 to a CPhraseLogic 250 class. Only top level languages are allowed to have a purpose of logic.

CLanguages 150 having a purpose 160 of dialect or custom may contain its own phrase logic which overrides its parent's phrase logic, or may simply defer phrase logic to its parent.

A CLanguage 150 may be the parent of zero or more CLanguages, as represented at 175, creating a hierarchical structure leading to an inheritance relationship in the generated phrase book code between a parent language and its sibling language(s). The hierarchical structure of languages allows custom dialects to share the same phrase logic as the parent. At the same time, "custom" utterances are possible by overriding certain terms, or in some instances, all utterance files, that differ from the parent base language.

For instance, an English base language having the purpose 160 of logic may be the parent of a Scottish "language" having the purpose 160 of dialect. In this way, the Scottish dialect may inherit the phrase logic of the English language while having its own utterance files for terms that are worded differently in the Scottish dialect.

A language may also contain a set of internal phrases which may have unique logic for speaking these phrases. For example, the speaking of numbers and dates are best left to the language since each language may have unique logic for speaking these phrases. These internal phrases are represented by the CPhrase 200 base class, and are associated with a CLanguage 150 by aggregation line 180. The CPhrase 200 class is described in further detail below. Logic used to speak internal phrases is accounted for by aggregation line 248 connecting a CLanguage 150 to its CPhraseLogic 250.

Internal phrases are associated with a language and are protected-virtual methods in the language's run-time phrase book.

On the other hand, external phrases do not require language specific logic to speak them. External phrases are also modeled by the CPhrase 200 base class and are associated with a CPhraseBookDesign 100, as shown by association line 125. External phrases become public-virtual methods in the application's run-time phrase book. Unlike private-virtual methods, public-virtual methods can be called directly by the application software.

If a CLanguage 150 is deleted, then all of its internal phrases are deleted, as well as its CPhraseLogics 250 and CLanguageUtterances 400. The CPhraseLogic 250 and CLanguageUtterance 400 classes are described in further detail below.

The CLanguage 150 class also uses a version 165 attribute to keep track of phrase book compatibility between itself and an installed utterance catalog, and itself and an application. An utterance catalog is a directory hierarchy containing recorded utterances. The directory hierarchy has a version stamp which is checked when the system run-time starts the application.

The version 165 attribute is composed of a high and low number. The high component is incremented if a CPhrase 200 is added or deleted during a phrase book design session. The low component is incremented whenever the CPhraseLogic 250 is modified, or a CLanguageUtterance 400 is added or deleted during a design session. The high and low version together comprise a version range from the low to the high version inclusively. At run-time the version range for the utterance catalog must overlap with the version range for the phrase book DLL. If there is no version number which occurs in both ranges, the utterance catalog and the phrase book DLL are deemed to be incompatible. If this happens, the system logs an error and does not use the phrase book DLL. On the other hand, only the high number must match up with the application's high number to ensure that the virtual tables in the phrase book match up with the application's set of phrases.

A production 170 attribute of the CLanguage 150 class is set to TRUE for all CLanguages that have implemented or inherited CPhraseLogic 200 for all phrases. A FALSE setting indicates that one or more phrases of the language does not have an associated phrase logic, causing the system to not generate code for the phrase book.

CPhrase and CArgument Classes

CPhrase 200 has a name 201 attribute for the name of the phrase (e.g. "YouHaveNewMessages"). A summaryDescription 202 attribute describes how the phrase is used (e.g. "Inform user of how many new messages exist in their mailbox"). A phraseLogicNotes 203 attribute provides notes to the designer implementing the phrase logic. For example, for a phrase used to inform users of the number of new messages in their mailbox, the note to the designer may say: "The new message count is the number of messages which have arrived since the last time the mailbox holder called in to check the messages."

A recordingSessionNotes 204 attribute is used for notes to be used at the recording session to help with the recording of the phrase. The note may indicate, for instances, which words of the phrase are to be stressed over others.

A Signature( ) 205 method in the CPhrase 200 class returns the signature string of the phrase. The signature is composed of the phrase name along with the list of its arguments.

A IsTrivial( ) 206 method in the CPhrase 200 class returns TRUE if the phrase contains an empty argument list and FALSE otherwise.

The arguments of a phrase are represented by a CArguments class 300, and associated with a CPhrase through association line 207. CArguments 300 are used by the phrase logic when speaking the phrase.

A CArgument 300 contains the attributes typeAndName 301 for the type and name of the argument. For example, a "You have new messages" phrase may have a CArgument with its typeAndName set to "int n," where "n" is the variable for the number of new messages.

During the simulation 36 stage (FIG. 1), a designer may assign values to variables to test the designed phrase book. A prompt 302 attribute and a simulation type 303 attribute aid the designer in doing so.

The prompt 302 attribute prompts a phrase book designer for input (e.g. "Enter the number of new messages."). The simulation type 303 attribute is set to the type of argument to be prompted for during simulation. The system supports the simulation types 303 Integer, String, Date time, Utterance, and Other. Simulation is not provided for phrases that contain arguments with a simulation type 303 of Other.

A GetType( ) 304 and a GetName( ) 305 method allow access to the type and name of arguments contained in the CArgument 300 class.

CPhraseLogic Class

The CPhraseLogic 250 class is best thought of as an entry in a matrix where the rows are the set of languages used by an application (as represented by aggregation line 248 to the CLanguage 150 class), and the columns are the set of phrases used by the application (as represented by aggregation line 246 to the CPhrase 200 class).

For simple phrases that have no arguments, the CPhraseLogic class is automatically generated. No phrase logic is necessary and the corresponding utterance from the utterance catalog will simply be played.

For more complex phrases that do have arguments, one of two approaches may be invoked to create the CPhraseLogic class, depending on the particular language or phrase. One approach is for a phrase book designer to manually write the implementation of the phrase logic. Under this approach, the logic 251 attribute is set to the code used to decide how to speak the phrase. In the preferred embodiment, the code is written in C++.

In a second approach, the logic for the phrase is simply deferred to the logic existing for the parent language.

Internal phrases have at least one phrase logic that is associated with them, as depicted by aggregation line 246.

CRecordingSessionSentence Class

Each CPhraseLogic 250 contains a set of CRecordingSessionSentences 350. These are recording scripts for a voice talent to use in the studio. Even when an utterance is just a portion of a sentence, it is a good idea to record an entire sentence in order to get the inflection right, then edit the utterance out of the middle. The system therefore maintains one or more sentences for every phrase used in the application. Each sentence is simply an ordered list of utterances used in that phrase, interspersed with example text to hold the place of arguments. The sentences are entered when the phrase logic designer enters the list of utterances needed for each phrase.

Third-party voice editing tools may be integrated with the system to allow an utterance production engineer to edit the individual utterances from a studio voice recording session and "paste" them into an utterance database.

An AsString( ) 351 method of the CRecordingSessionSentence 350 class provides a way to generate textual reports of recording session sentences.

CSentenceFragment, CSentenceContext, and CUtterance Classes

A CRecordingSessionSentence 350 class is associated with an ordered list 352 of zero or more CSentenceFragments 450. The CSentenceFragment 450 class is an abstract base class for the CSentenceContext 500 and the CUtterance 550 classes.

The CSentenceContext 500 class contains context-sensitive text that is needed to create a CRecordingSessionSentence 350, but which is not part of the utterances spoken by the phrase logic. For example the text "John Smith" and "5" are two examples of a CSentenceContext 500 in the sentence "To leave a message for [John Smith] please press [5]."

The CUtterance 550 class contains the following attributes: name 551 for a terse name of the utterance (e.g. "ToLeaveAMessage"); text 451, which is an attribute inherited from the CSentenceFragment 450 class, for the textual representation of the utterance (e.g. "To leave a message"); and notes 552 for information on the utterance, its use, or its recording (e.g. "Should always be the start of a phrase").

CSentenceContexts 500 and CUtterances 550, then, make up a CRecordingSessionSentence 350.

CLanguageUtterance Class

The CLanguageUtterance 400 class is best thought of as an entry in a matrix where the rows are the set of languages (as represented by aggregation line 254 to the CLanguage 150 class), and the columns are the set of utterances (as represented by aggregation line 406 to the CUtterance 550 class). Therefore, for each language that needs a recording for an utterance, there exists an entry in the matrix called the language utterance.

A unique language utterance must be recorded for each language with a purpose 160 of "logic" or "dialect." A unique set of utterances may be recorded for languages with a purpose 160 of "custom," which may then be used to override a set of language utterances for a parent language.

The CLanguage 150 obtained by traversing the link from CLanguageUtterance 400 to CLanguage 150 must be the same as, or a parent of, the CLanguage 150 obtained by traversing the link from CLanguageUtterance 400 to CUtterance 550 then to CPhraseLogic 250, to finally CLanguage 150.

The CLanguageUtterance 400 class contains several attributes. The overrideText 401 attribute is the textual representation of the language utterance. This field is optional, and should only be filled in when the spoken text stored in the voice file is different than the text 451 (inherited from the CSentenceFragment class 450) stored in the CUtterance 550 class. The voiceFileID 402 attribute is used to identify the voice recording associated with the language utterance. The cache 403 attribute is set to TRUE if the language utterance should be cached in memory (rather than read from disk) at run-time to improve performance. The notes 552 attribute, which is an attribute inherited from the CUtterance 550 class, depicts any special notes regarding the language utterance, its use, or its recording. The voiceFile attribute 404 is used for the recorded voice representation of the text. This is optional and should be set only if the voice file attribute is set. The CLanguageUtterance 400 class, therefore, is associated with the CRecordingSession 650 class if and only if a voiceFile 404 has been placed into the CLanguageUtterance 400.

CRecordingSession and CVoiceTalent Classes

The CRecordingSession 650 class provides general information about each recording session. These include the date 651 and location 652 of the recording session, as well as the quality 653 of the recording indicating whether production or simulated version of the utterances was recorded.

Each recording session is associated with a voice talent, as denoted by association line 601 between CRecordingSession 650 and CVoiceTalent 600 classes. A voice talent is the person who actually speaks each of the utterances in order to be recorded.

There is a redundant link 101 between CPhraseBookDesign 100 and CVoiceTalent 600 in order to speed access to CVoiceTalents 600 and CRecordingSessions 100 for GUI display purposes.

Once a phrase book has been designed, it is stored in the system's database. In the preferred embodiment, the system integrates a commercial, Object Oriented Database that can store all the attributes and associations possible in C++.

Figure 4:
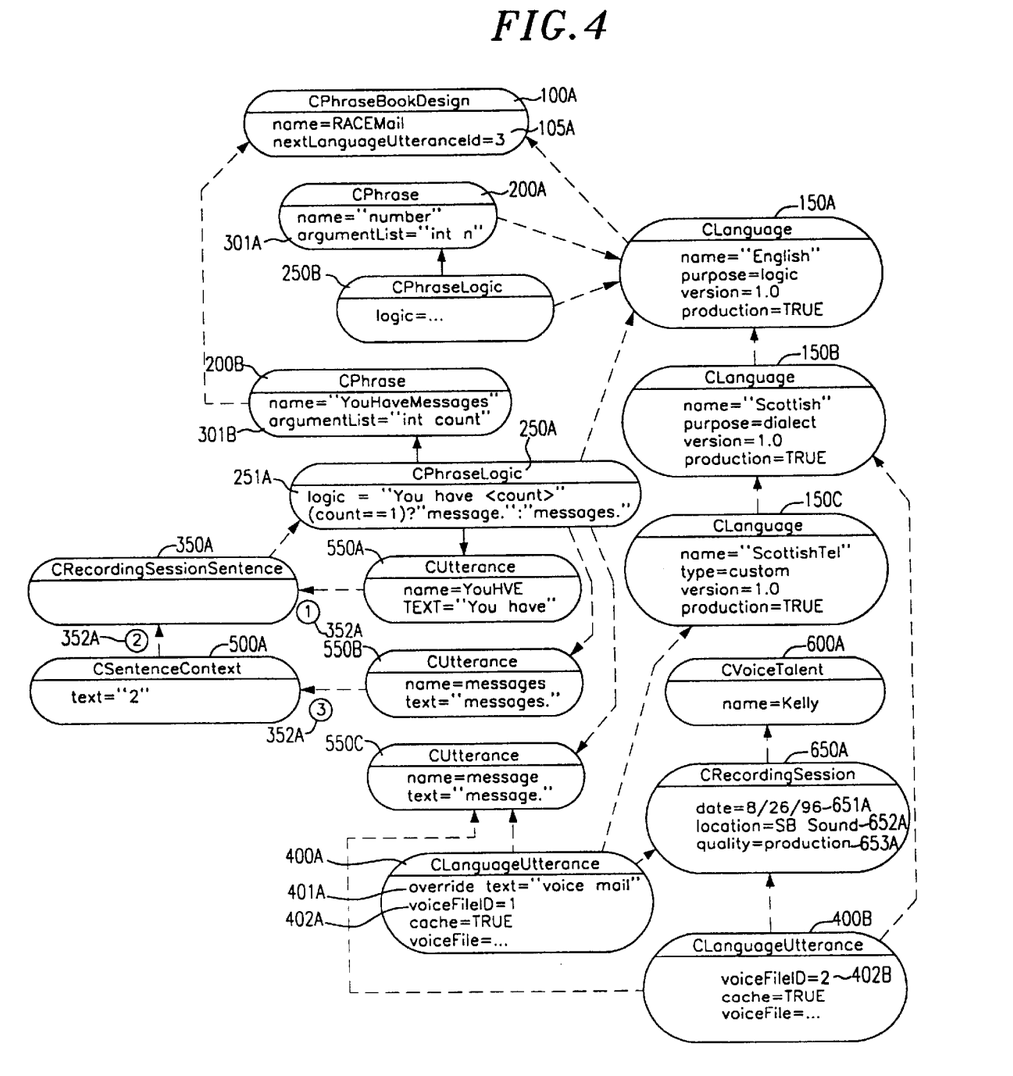
FIG. 4 is an exemplary instance diagram for the Phrase Book Designer object model shown in FIG. 3.

Referring to FIG. 4, shown here is an exemplary instance diagram as described in *Object Modeling and Design* by James Rumbaugh et al., Prentice Hall, 1991, for the phrase book design object model shown in FIG. 3. This instance diagram illustrates a hypothetical messaging application called "RACEMail." Thus, the name of the CPhraseBookDesign instance 100A is likewise "RACEMail."

The application contains the English language 150A, which is the parent of the Scottish dialect language 150B, which is the parent of the ScottishTel custom language 150C. English is the top language containing the logic to speak the phrases, as shown at 250A and 250B.

Shown in this example is the internal phrase "number" 200A and the external phrase "YouHaveMessages" 200B, which are both instances of the CPhrase 200 class. The internal phrase has "int n" 301A as an argument, and the external phrase has "int count" 301B as an argument.

Phrase logic for the external phrase is shown at 250A. The logic attribute 251A specifies whether to use the word "message" or "messages" depending on the variable "count" obtained from the argument list shown at 301B.

The phrase logic shown in 250A is made up of the "YouHave" 550A "messages," 550B and "message" 550C instances of the CUtterance 550 class (see FIG. 3).

Also shown is an instance of the CRecordingSessionSentence 350 (see FIG. 3) as an example recording session sentence 350A. The recording session sentence 350A is made up of the utterance "You have" 550A; the sentence context "2" 500A; and the utterance "messages" 550B. The encircled numbers 352A indicate the order in which the utterances are to be recorded. These utterances, therefore, combine to form the example recording session sentence, "You have 2 messages."

Also shown in FIG. 4 is a specialized language utterance for the ScottishTel 150B custom language along with its recording session. The utterance "message" 550C is associated with an instance 400A of the CLanguageUtterance 400 class with the override text 401A set to "voice mail." This CLanguageUtterance instance 400A is in turn associated with the ScottishTel 150C custom language. Thus, for the ScottishTel custom language, the word "voice mail" will be used instead of the word "message."

The voiceFileID 402A attribute of the CLanguageUtterance instance 400A, furthermore, gives the identification number of the voice file containing the recording of the utterance for "voice mail." The voiceFile 404A attribute provides the actual recorded voice representation of the utterance.

The CLanguageUtterance instance 400A is further associated with a recording session 650A and corresponding voice talent 600A. Information on the date 651 A, location 652A, and quality 653A of the recording session 650A, as well as the name of the voice talent 600A is provided.

The Scottish 150B dialect language is associated with a CLanguageUtterance instance 400B which does not have an override text for the associated utterance "message." Therefore, the voiceFileID 402B identifying the voice file location for the utterance "message" differs from the voiceFileID 402A identifying the voice file location for the utterance "voice mail."

Referring back to FIG. 1, once a phrase book has been designed, a set of utterances are recorded 32 for the phrases used in the application. The utterances are stored in an utterance catalog, which is a directory hierarchy containing the utterances.

The programmer then generates and compiles the phrase book code 34. Phrase book code generation is the process of converting the design-time representation of language, phrases, and utterances to a phrase book DLL used by the application. The command line 55 interface shown in FIG. 2 is responsible for code generation.

In the preferred embodiment, two C++ files are created for each language: a header file, PB<Language>.h, and an implementation file, PB<Language>.cpp, where <Language> is replaced by the actual language name. These files are compiled to produce an object file, PB<Language>.obj.

Figure 5:
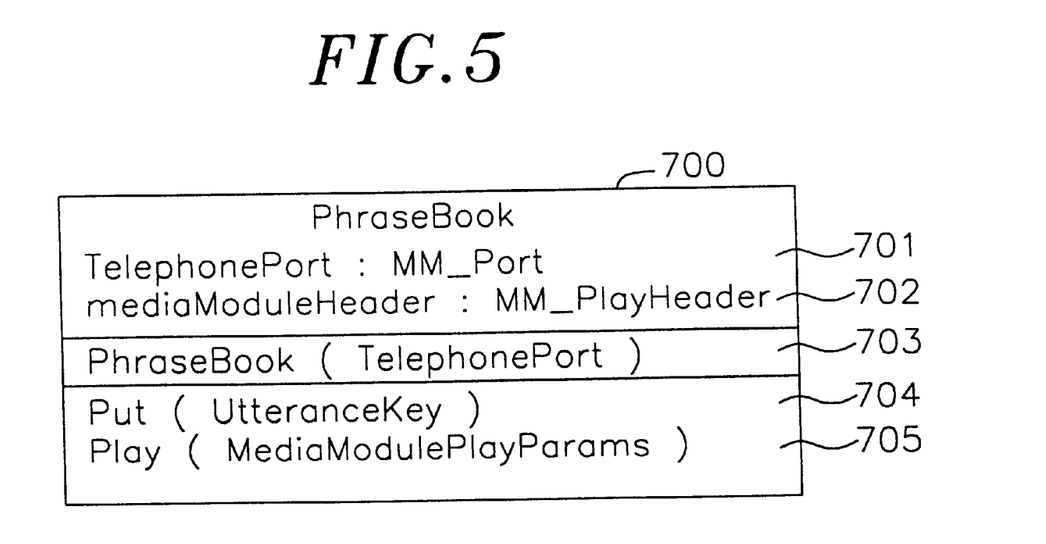
FIG. 5 is a class diagram for a PhraseBook abstract base class.

In addition to the ".h" and ".cpp" files created for each language, another pair of files, PB<Project>.h and PB<Project>.cpp are generated for the abstract base class from which all phrase books for a given application are derived (described in further detail in conjunction with a discussion of FIG. 5). The constructor for this class does some work that is common to all phrase books, as described in further detail in conjunction with FIGS. 7A–7B. These files are compiled to produce PB<Project>.obj. The PB<Project>.obj and PB<Language>.obj files are linked together to yield a DLL named <Project><Language><Version>dll.

Referring to FIG. 5, shown here is a class diagram of an abstract base class called PhraseBook 700. All the generated phrase books derive from this base class.

The PhraseBook 700 class has two attributes. The TelephonePort 701 attribute defines the port over which the phrase book plays its phrases. The mediaModuleHeader 702 attribute contains media file identifiers.

The PhraseBook 700 class also defines several methods. The PhraseBook (TelephonePort) method 703 is the constructor method for a phrase book. The Put(UtteranceKey) method 704 puts an utterance key into the header. The Play (MediaModulePlayParams) method 705 plays all utterances, that have been placed into the header, over the telephone port specified.

Referring to FIGS. 6A–6B and 7A–7B, shown here are flow diagrams of the code generation for a phrase book design.

Figure 6A:
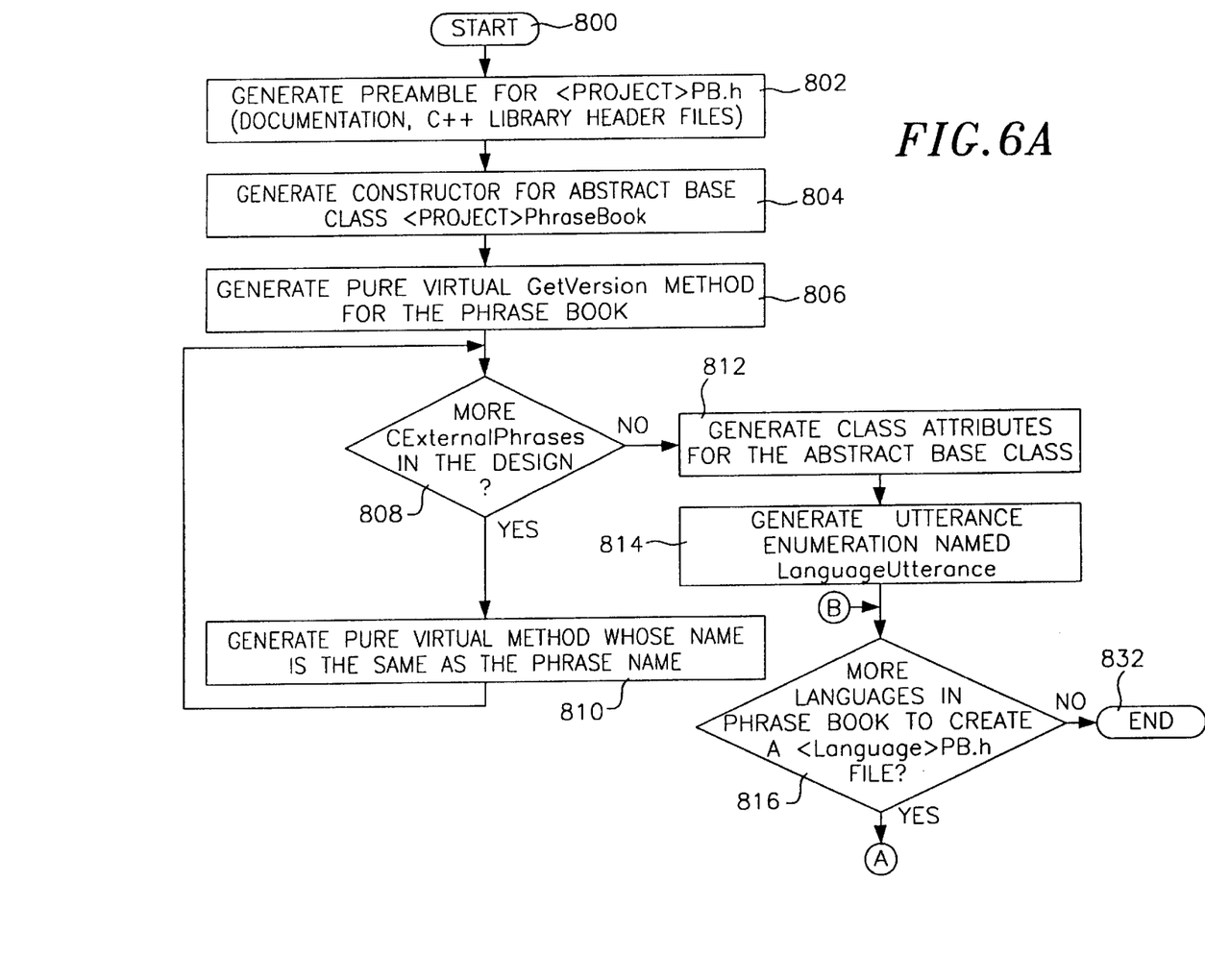
FIGS. 6A–6B are flow diagrams for generation of header files in accordance with a preferred embodiment.
Figure 6B:
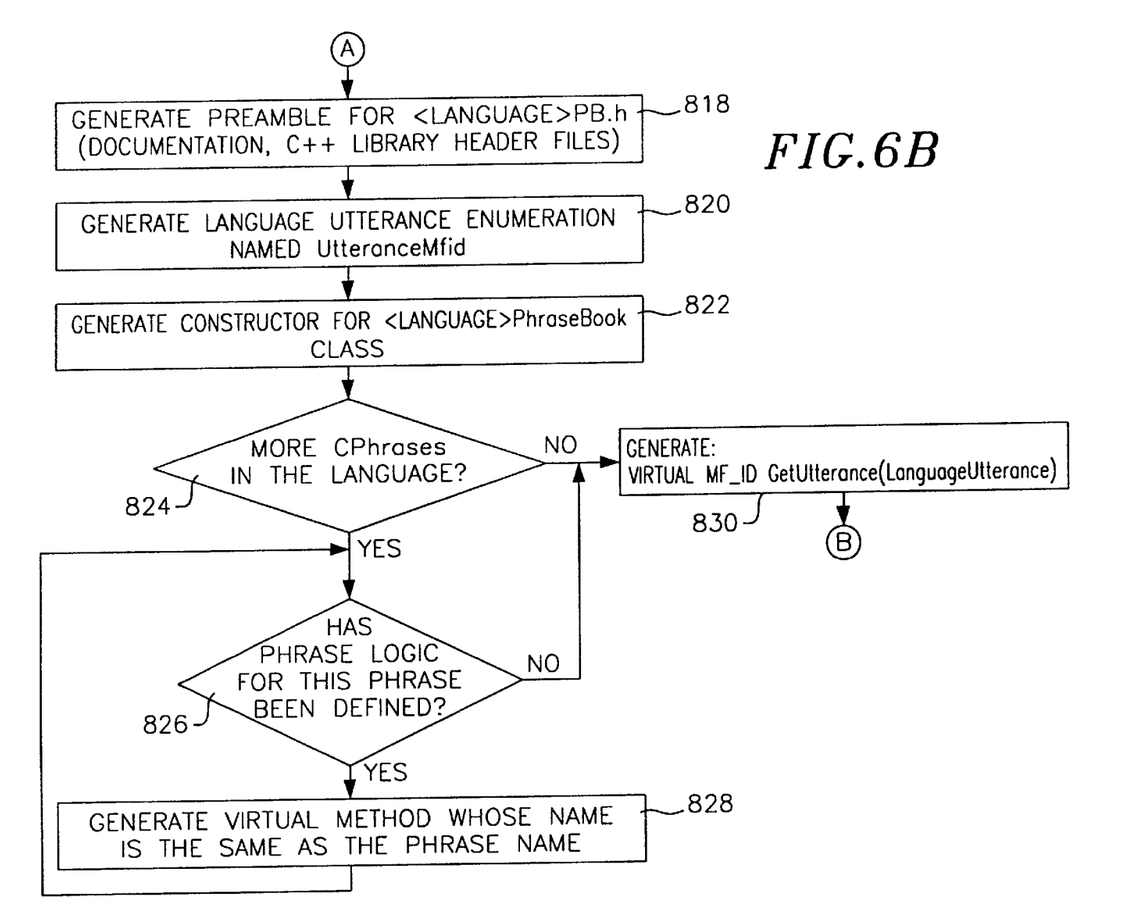

FIGS. 6A–6B show flow diagrams for the generation of the <Project>PB.h and <Language>PB.h header files. Header files are generated by the GenerateCode( ) 110 method of the CPhraseBookDesign 100 class shown in FIG. 3.

Referring back to FIGS. 6A–6B, code generation of header files begins at start oval 800. The header file for the project, <Project>PB.h, is generated first, as shown in steps 802–814.

The first step in generating the <Project>PB.h file is the generation of the preamble for this file, including documentation and C++ library header files 802.

The second step in generating the <Project>PB.h file is the generation of an abstract base class <Project>PhraseBook, described in conjunction with FIG. 5. Thus, a constructor for the base class is created first 804. Next, a pure virtual GetVersion method that returns the version number for the phrase book is generated 806. Control then passes to decision diamond 808 to determine whether or not more CExternalPhrases exist in the design 808. If they do, a pure virtual method whose name is the same as the phrase name is created for the CExternalPhrase. The method signature is determined by the CArgument 300 objects associated with the phrase, as described in conjunction with FIG. 3. Control then passes back to decision diamond 808.

If there are no more CExternalPhrases in the design, as depicted by the NO branch to decision diamond 808, the class attributes for the base class is generated next 812. In this case, the class attribute is simply a reference to a TelephonePort, as shown at 701 in FIG. 5.

The third step in generating the <Project>PB.h file is the generation of an utterance enumeration named LanguageUtterance that enumerates each utterance in the language. Each enumerator is the name of the utterance. This enumeration is local to the language phrase book. Its purpose is to provide a user-friendly name by which the application writer can refer to an utterance when writing phrase logic. At runtime, the virtual GetUtterance( ) method converts this enumerator to a voice file id by which the utterance is known to the telephone port, called a "mfid."

Header files for each language in the design, named <Language>PB.h, are generated next, as shown by steps 816–830.

First, a determination is made in decision diamond 816 as to whether or not there are any more languages to create header files for. If there are, a preamble for <Language>PB.h, including documentation and C++ library header files, is generated 818.

Second, a language utterance enumeration named UtteranceMfid is generated, mapping each utterance to a unique mfid. Each enumerator has the format <Language>_<Utterance>=mfid, where <Language> is replaced by the language name, <Utterance> is replaced by the utterance name, and mfid is a sequence number assigned by CPhraseBookDesign as shown at 105 in FIG. 3.

Third, a <Language>PhraseBook class is generated as described in steps 822–830. If the language has a parent, then the class is derived from the parent language class. Otherwise, it is derived from the <Project>PhraseBook abstract base class.

A constructor for the <Language>PhraseBook class is generated first 822. Control is then passed to decision diamond 824 for a determination of whether or not there are any more CPhrases in the language. If there are, an inquiry is made in decision diamond 826 as to whether or not the phrase logic has been defined for this particular phrase. If it has, then a virtual method whose name is the same as the phrase name is generated 828. The method signature is determined by the CArgument 300 objects (FIG. 3) associated with the phrase.

Next, a virtual method named MF_ID GetUtterance (LanguageUtterance) is generated to convert the utterance enumeration LanguageUtterance into an mfid.

When there are no more languages in the phrase book to create header files for, the routine ends as shown by 832.

Figure 7A:
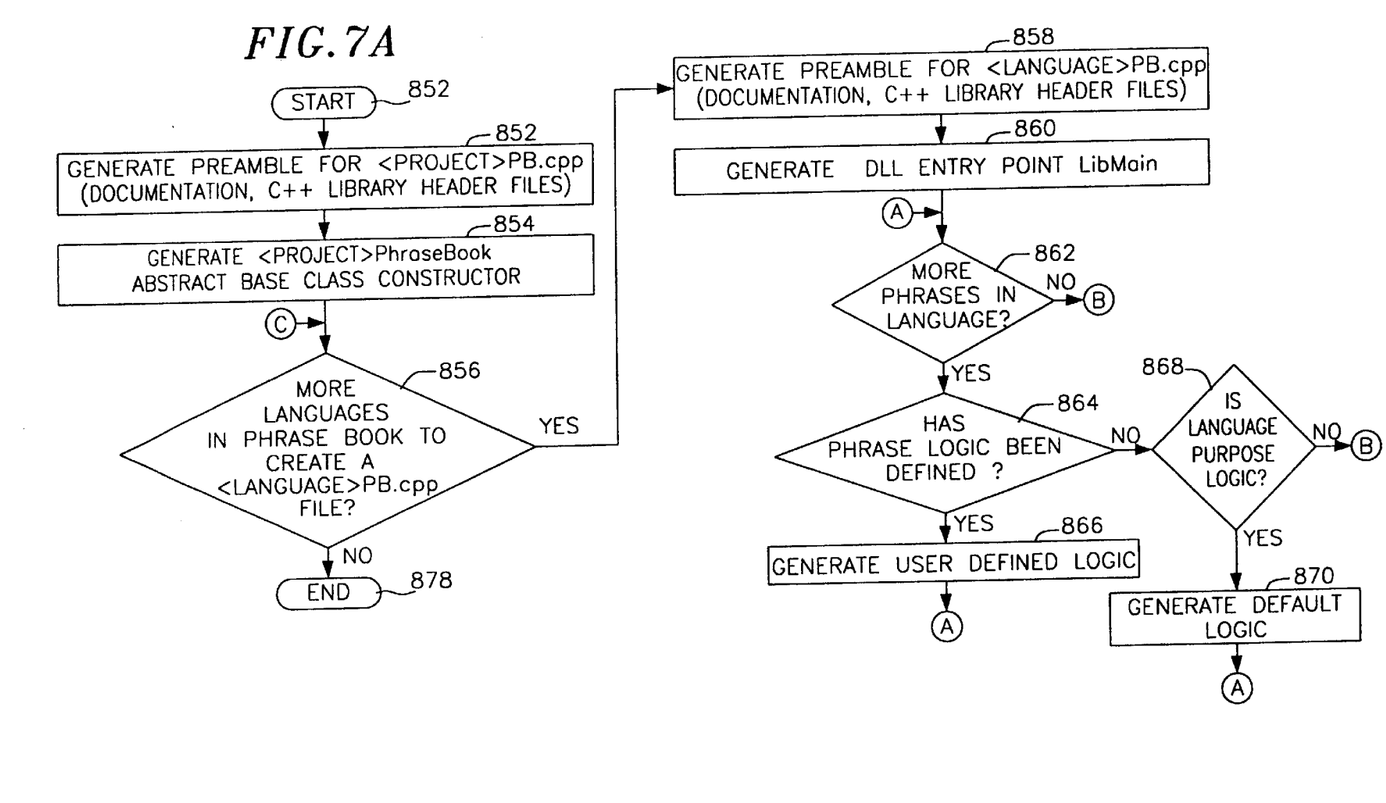
FIGS. 7A–7B are flow diagrams for generation of implementation files in accordance with a preferred embodiment.
Figure 7B:
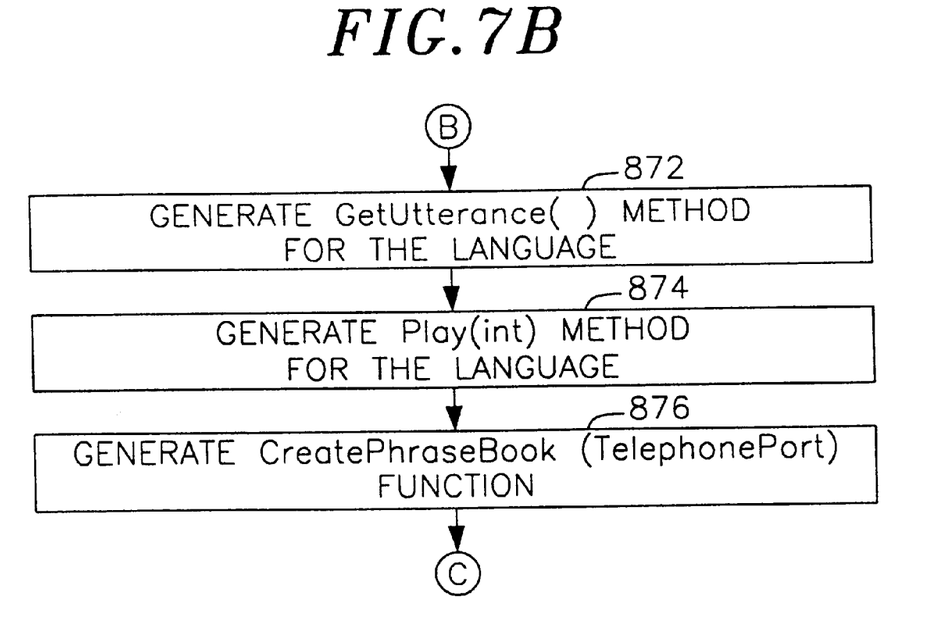

Referring to FIGS. 7A–7B, shown here are flow diagrams for the generation of <Project>PB.cpp and <Language>PB.cpp implementation files. Implementation files are also generated by the GenerateCode( ) 110 method of CPhraseBookDesign 100 shown in FIG. 3.

The implementation file generation begins at start oval 850. A <Project>PB.cpp file is generated first, as shown by steps 852–854. In step 852, a preamble for the <Project>PB.cpp file is generated, including documentation and C++ library header files. Next, a <Project>PhraseBook constructor is generated 854. This constructor initializes the TelephonePort data member described at 701 in conjunction with FIG. 5.

Implementation files for each language in the design, named <Language>PB.cpp are generated next, as shown by steps 856–876.

First, a determination is made in decision diamond 856 as to whether or not there are more languages in the phrase book to create implementation files for. If there are, a preamble for <Language>PB.cpp, including documentation and C++ library header files, is generated 858.

Next, a DLL entry point for the language, called LibMain, is generated 860. LibMain initializes the C++ runtime library when the DLL is initially loaded.

Control passes then to decision diamond 862 where a determination as to whether or not there are more phrases in the language is made. If there are, an inquiry is made as to whether or not the phrase logic for the current phrase has been defined 864. If the answer is YES, a user defined logic is generated 866 in a method whose name and signature are dictated by the GetSignature( ) method of the CPhrase 200 class shown in FIG. 3.

If phrase logic has not been defined, a further inquiry is made in decision diamond 868 as to whether or not the purpose of the current language is "logic" (see attribute 160 in FIG. 3). If the answer is YES, default logic to play the associated utterance is generated, using the phrase name for the method name 870.

If there are no more phrases in the language, as depicted by the NO branch to decision diamond 862, a GetUtterance( ) method for the current language is created 872. This method contains a table and code to map the utterance to a mfid that can be passed to the telephone port.

Next, a Play(int) method is generated for the current language 876. This method is used to play phrases by number during the phrase book simulation stage. The number is an ordinal determined by the phrase's position in the design structure.

After a <Language>PhraseBook class has been generated, a CreatePhraseBook(TelephonePort&) function is generated 876 for the current language. This is an entry point in the DLL invoked by the runtime to instantiate a phrase book.

Referring back to decision diamond 856, if there are no more languages for which to create implementation files for, the routine ends, as shown at 878.

After a phrase book design is complete and code has been generated and compiled, the designer may simulate the phrase book, as shown by step 36 of FIG. 1. The system allows a user to select a phrase book DLL. Once the DLL is opened, a pick-list of phrases are presented to the user. The system prompts the user for all associated arguments for a selected phrase. After the arguments are entered, the system calls a generic SpeakPhrase method on the application level phrase book to speak the selected phrase.

After testing and simulation, the application may now run the phrase book code (step 38). To do so, the application constructs an instance of a language-specific phrase book. The phrase book might be a dialect of a language, or a custom version of a language. The application passes around a pointer to the application-level phrase book in the phrase book hierarchy.

Figure 8:
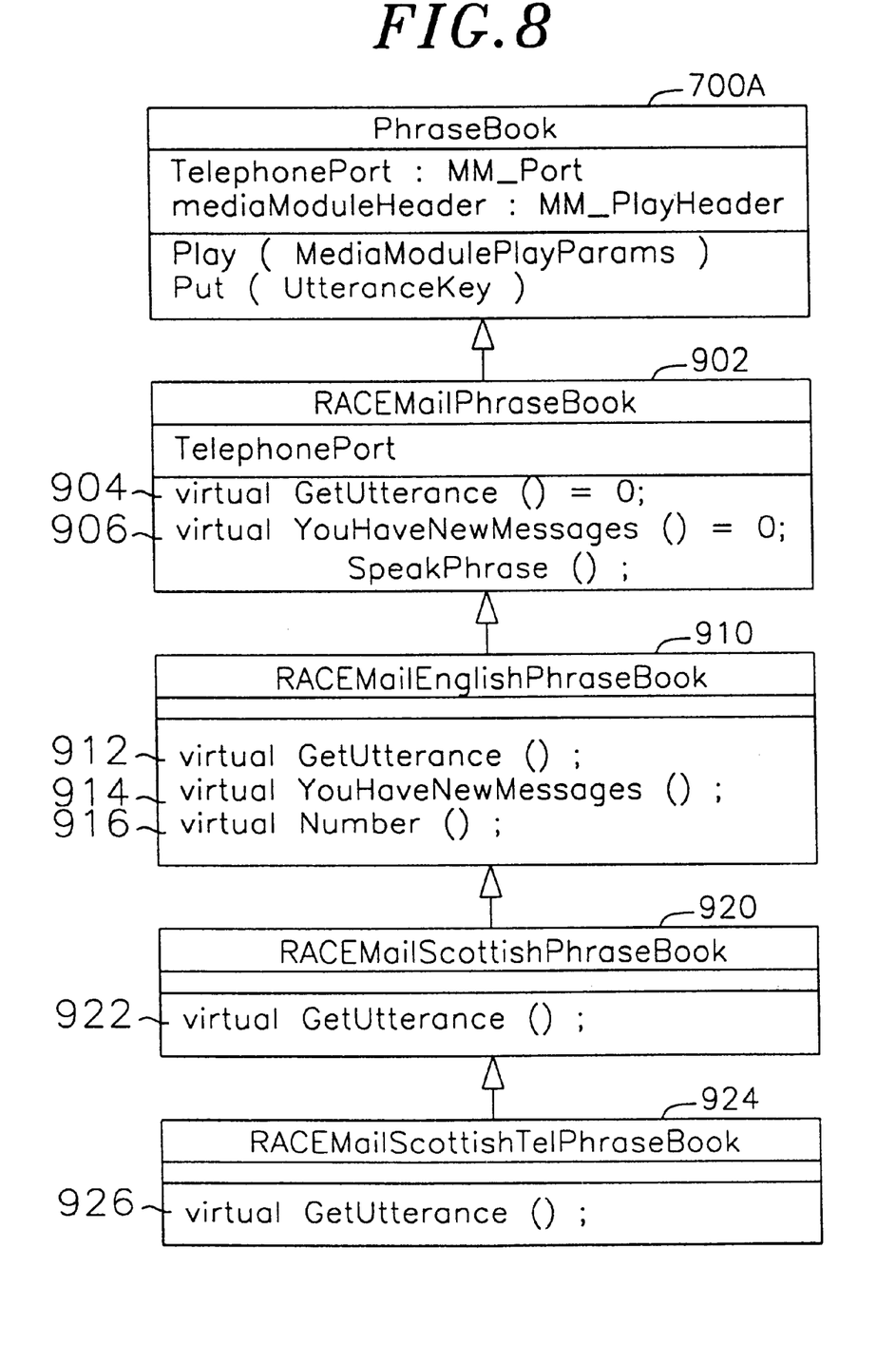
FIG. 8 illustrates a phrase book hierarchy for the application shown in FIG. 2.

FIG. 8, discussed in more detail below, shows the phrase book hierarchy for the RACEMail application example discussed in conjunction with FIG. 4. PhraseBook 700A is the abstract base class discussed in conjunction with FIG. 5. The abstract application-level phrase book, RACEMailPhraseBook, 902 derives from PhraseBook 700A. RACEMailEnglishPhraseBook 910 is a language-specific phrase book that derives from the application-level phrase book. RACEMailScottishPhraseBook 920 is another instance of the language-specific phrase book, which inherits from the English phrase book. The RACEMailScottishTelPhraseBook 924 in turn inherits from the Scottish dialect.

All phrase books contain a virtual method GetUtterance( ), as shown at 904, 912, 922, and 926, to get a handle to a specified utterance. In addition, an abstract application phrase book contains a virtual method for each external phrase used to speak the phrase, and a SpeakPhrase( ) method used during simulation to speak a desired phrase. Accordingly, RACEMailPhraseBook 902 contains a virtual method for the external phrase YouHaveNewMessages 906 as well as a SpeakPhrase( ) method 908.

Using the pointer to an application-level phrase book, the application can make calls to the external phrases defined in the phrase book. C++ polymorphism ensures that the correct implementation for the external phrase is executed even though the application is calling a method on the application-level phrase book. C++ polymorphism also ensures that the desired utterances are spoken, even when the phrase logic is defined high in the hierarchy.

For example, an application may construct a RACE-MailScottishTelPhraseBook 924 based on the hierarchy shown in FIG. 8. The application then refers to the phrase book as a RACEMailPhraseBook 902. When the application must speak the phrase YouHaveNewMessages, it calls the method YouHaveNewMessages( ) 906 on the RACEMailPhraseBook 902. However, polymorphism allows the method to be defined and executed in the RACEMailEnglishPhraseBook 910 (see 914). The method Number( ) 916 for speaking the phrase for the number of new messages, is also defined and executed here.

The implementation speaks utterances, some of which are customized by the RACEMailScottishTelPhraseBook 924. Again, due to polymorphism, the GetUtterance( ) 926 method ensures that the correct utterance key is spoken by the phrase logic.

A PhraseBookManager template class manages the dynamic loading of phrase book DLLs. PhraseBookManager provides a constructor method which takes the name of the application software and the path to the directory that contains the application phrase books as parameters. A LoadPhraseBook( ) method takes as parameters the name and version of the language to load. This method finds the DLL in the application's phrase book directory that matches the application name, language name, and language version. This method then dynamically loads the DLL. Finally, a pointer to the function named CreatePhraseBook within the DLL (see FIG. 7B step 876) is saved.

A GetPhraseBook( ) method takes as parameters the language and version of the phrase book to construct, and the telephone port that the phrase book should use. This method returns a pointer to an instance of the requested phrase book. The data type of this pointer is the application's abstract phrase book type. This method finds the saved pointer to the CreatePhraseBook function for the language and version and calls CreatePhraseBook( ) with the TelephonePort as a parameter (see FIG. 7B step 876).

For example, to declare a PhraseBookManager for RACEMailPhraseBook classes (see FIG. 8), an application would include the following code, preferably in main( ).

PhraseBookManager
   <RACEMailPhraseBook>phraseManager
   ("C:\\RaceMail\\PhraseBooks");

To load a phrase book for a particular language and version, the application would include the following code:

phraseManager.LoadPhraseBook (language, version);

If the application needs a phrase book for a language, it would include the following code:

std::auto_ptr <RACEMailPhraseBook>pb=
   phraseManager. GetPhraseBook (language, version, MMPort);

The system allows phrase books to the added to the application while the application is running. This requires that the application developer provide administrative support for installing phrase books and allowing changeover while the application is running. Migration of applications is achieved by running the old and new application side by side and switching over some subscribers or ports to the new application, then switching completely over to the new application after it has been proven to run correctly.

Referring back to FIG. 1, the last step in the natural flow of a phrase book creation is phrase book maintenance. The system's GUI 50 shown in FIG. 2 allows a developer to design, maintain, or modify an application's phrase books.

Menus and dialog boxes aid a developer to view and edit a phrase book and utterance catalog. A developer may view all the phrases for a selected language, and may further edit the properties (attributes) of the language shown in FIG. 3, such as the name 201, summaryDescription 202, argument list (typeAndName 301), phraseLogicNotes 203, and recordingSessionNotes 204.

The developer may also edit the attributes of the CPhraseLogic 250 class, such as the logic 251 attribute. The properties of a CRecordingSessionSentence 350, CSentenceContext 500, CUtterance 550 CLanguageUtterance 400, CRecordingSession 650, and CVoiceTalent 600 may also be edited.

The system also allows the generation of a report at any time, showing all the phrases created for a specific language, or every phrase which contains an occurrence of a given phrase. The system's GUI 50 provides the entry point for the design of reports, as represented by block 65 of FIG. 2.

In a preferred embodiment, reports are designed using report designers available commercially, such as Crystal Reports v5.0 (which is a trademark of Seagate Software). Data necessary to create a report is stored in a temporary database 70 like Microsoft Access (which is a trademark of Microsoft Corporation).

In an exemplary scenario, reports may be used to find every occurrence of the word "mailbox" in order to generate a new dialect which instead uses the word "message box." A report may also be generated to show whether or not a particular phrase has been translated for a given language.

Reports may also be used to generate recording scripts. The system can generate a recording script for a given language at any time. A designer may invoke the system's reporting feature to generate a report of every utterance which does not have a voice file from a production recording session. The system may further report the text of the smallest set of sentences it can find which include every selected utterance. A recording script may then be generated from this information.

The system therefore, allows voice applications to support new languages with different syntaxes and grammars, without stopping it to rewrite the application software. This is possible because the logic to speak the phrases is not contained in the main application, but in separate phrase books. Each phrase book is stored as a dynamically loadable library. When a new phrase book supporting a new language is created, it is loaded dynamically into an instance of the application without stopping it.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. For instance, the system can be programmed in any number of programming languages besides C++ to achieve the underlying principles of the present invention. Furthermore, the content of the reports created by the system may be expanded and/or modified. It is therefore contemplated that the appended claims will cover any such modifications of embodiments that fall within the true scope of the invention.

What is claimed is:

1. A system comprising:
   a voice application with which a user interacts; and
   at least one dynamically-loadable phrase book library, separate from the voice application, that comprises, for each of a plurality of different phrases of a particular language, a method comprising program code that when executed causes the phrase to be played, the voice application invoking execution of a selected method of the dynamically-loadable phrase book library to cause a corresponding phrase to be played to the user, whereby the program code that causes different phrases to be played is separated from the voice application.

2. The system recited in claim 1, wherein each phrase comprises one or more utterances, and wherein a representation of each utterance is contained within the dynamically-loadable phrase book library.

3. The system recited in claim 1, wherein a method may have associated parameters that are passed to the dynamically-loadable.phrase book library by the voice application when the voice application invokes execution of the method.

4. The system recited in claim 1, comprising a plurality of dynamically-loadable phrase book libraries each for playing phrases of a respective one of a plurality of different languages.

5. The system recited in claim 4, wherein any of the plurality of dynamically-loadable phrase book libraries can be loaded dynamically into an instance of the voice application without interrupting execution of the voice application.

6. The system recited in claim 1, wherein the dynamically-loadable phrase book library may comprise an instance of a language class that defines a dialect of a base language, wherein the language class that defines the dialect inherits code for playing phrases from another class that defines the base language.

7. A computer-readable medium having computer executable program code stored thereon, the program code comprising:
   a voice application with which a user interacts; and
   at least one dynamically-loadable phrase book library, separate from the voice application, that comprises, for each of a plurality of different phrases of a particular language, a method comprising program code that when executed causes the phrase to be played, the voice application invoking execution of a selected method of the dynamically-loadable phrase book library to cause a corresponding phrase to be played to the user, whereby the program code that causes different phrases to be played is separated from the voice application.

8. The computer-readable medium recited in claim 7, wherein each phrase comprises one or more utterances, and wherein a representation of each utterance is contained within the dynamically-loadable phrase book library.

9. The computer-readable medium recited in claim 7, wherein a method may have associated parameters that are passed to the dynamically-loadable phrase book library by the voice application when the voice application invokes execution of the method.

10. The computer-readable medium recited in claim 7, comprising a plurality of dynamically-loadable phrase book libraries each for playing phrases of a respective one of a plurality of different languages.

11. The computer-readable medium recited in claim 10, wherein any of the plurality of dynamically-loadable phrase book libraries can be loaded dynamically into an instance of the voice application without interrupting execution of the voice application.

12. The computer-readable medium recited in claim 7, wherein the dynamically-loadable phrase book library may comprise an instance of a language class that defines a dialect of a base language, wherein the language class that defines the dialect inherits code for playing phrases from another class that defines the base language.

13. A method comprising:

designing a voice application with winch a user interacts; and designing at least one dynamically-loadable phrase book library, separate from the voice application, that comprises, for each of a plurality of different phrases of a particular language, a method comprising program code that when executed causes the phrase to be played, the voice application invoking execution of a selected method of the dynamically-loadable phrase book library to cause a corresponding phrase to be played to the user, whereby the program code that causes different phrases to be played is separated from the voice application.

14. The method recited in claim 13, wherein each phrase comprises one or more utterances, and wherein the method further comprises recording the utterances and including a representation of each utterance as part of the dynamically-loadable phrase book library.

15. The method recited in claim 13, further comprising providing one or more methods with associated parameters that the voice application can pass to the dynamically-loadable phrase book library when the voice application invokes execution of the method.

16. The method recited in claim 13, comprising designing a plurality of dynamically-loadable phrase book libraries each for playing phrases of a respective one of a plurality of different languages.

17. The method recited in claim 16, further comprising dynamically loading one of the plurality of dynamically-loadable phrase book libraries into an instance of the voice application without interrupting execution of the voice application.

18. The method recited in claim 13, wherein designing the dynamically-loadable phrase book library further comprises creating a language class that defines a dialect of a base language, wherein the language class that defines the dialect inherits code for playing phrases from another class that defines the base language.

\* \* \* \* \*